United States Patent
Guigonis

(10) Patent No.: US 6,880,365 B1
(45) Date of Patent: Apr. 19, 2005

(54) USE OF SINTERED REFRACTORY MATERIAL BASED ON TIN OXIDE FOR PRODUCING GLASS FURNACE THROATS

(75) Inventor: Jacques Marius Louis Guigonis, Pernes les Fontaines (FR)

(73) Assignee: Societe Europeenne des Produits Refractaires, Courbevoie (FR)

( * ) Notice: Subject to any disclaimer, the term of this patent is extended or adjusted under 35 U.S.C. 154(b) by 282 days.

(21) Appl. No.: 10/110,752
(22) PCT Filed: Oct. 25, 2000
(86) PCT No.: PCT/FR00/02968
§ 371 (c)(1), (2), (4) Date: Apr. 16, 2002
(87) PCT Pub. No.: WO01/30710
PCT Pub. Date: May 3, 2001

(30) Foreign Application Priority Data

Oct. 27, 1999 (FR) .......................................... 99 13447

(51) Int. Cl.[7] .............................. C03B 5/00; C03B 7/00
(52) U.S. Cl. ................... 65/374.1; 65/374.12; 65/324; 65/342; 373/122; 373/30; 373/27; 373/36; 373/37; 373/38; 501/134; 501/135
(58) Field of Search ............................ 65/374.1, 374.12, 65/324, 342; 373/122, 30, 27, 36, 37, 38; 501/134, 135; 428/332

(56) References Cited

U.S. PATENT DOCUMENTS

| | | | |
|---|---|---|---|
| 4,388,721 A | 6/1983 | Hall, Jr. et al. | |
| 4,426,217 A | 1/1984 | Farrar et al. | |
| 5,151,918 A | * 9/1992 | Argent et al. | ............... 373/27 |
| 6,200,674 B1 | * 3/2001 | Kumar et al. | ............... 428/332 |

FOREIGN PATENT DOCUMENTS

EP     0 939 065 A1     9/1999

* cited by examiner

Primary Examiner—Peter Chin
Assistant Examiner—Mark Halpern
(74) Attorney, Agent, or Firm—Young & Thompson

(57) ABSTRACT

The use of blocks (1, 2, 3, 4) based on sintered tin oxide for producing the throat of a glass furnace.

6 Claims, 1 Drawing Sheet

USE OF SINTERED REFRACTORY MATERIAL BASED ON TIN OXIDE FOR PRODUCING GLASS FURNACE THROATS

The invention concerns the use of sintered refractory materials based on tin oxide for producing glass furnace throats and the throats produced in this way.

Sintered tin oxide is used for the electrodes in furnaces for melting some kinds of glass. Molybdenum heating electrodes are usually employed in electric furnaces for melting glass, especially alkali-lime glass. This material offers very high current densities. However, molybdenum cannot be used for lead (crystal) glass, because it reduces the lead. Tin oxide electrodes, which are well known for their electrical conductivity, are therefore used.

In current practice, the electrodes are the only parts of industrial glass furnaces in which products based on sintered tin oxide may be encountered.

Each zone of a glass furnace has a particular function and is therefore subject to specific constraints.

The throat is a closed passage through which the molten glass from the melting bath passes, after which it is directed towards the fining bath and then the feeders. The temperature of the molten glass falls as it travels along this path; for example, the temperature in the throat is of the order of 1 350° C. to 1 500° C. while the glass passing through the feeders typically has a temperature from 1 100° C. to 1 350° C.

The throat is an area with very little thermal insulation and is very severely corroded and eroded by the molten glass. It is severely eroded because all of the molten glass must flow through its limited cross section. For example, in a furnace with a surface area of approximately 100 m$^2$, the glass must flow at a rate corresponding to 400 metric tons per day through a cross section of approximately 0.8 m$^2$. Because it is subjected to these levels of corrosion and erosion, the throat wears faster than most other zones of the furnace. It is often the wear of the throat that determines the end of the service life of a furnace.

At present two types of materials are mainly used to withstand the stresses to which the throats of glass furnaces are exposed.

The material most widely used is an alumina-zirconia-silica (AZS) electroslag product containing approximately 41% zirconia. One example is the ER-1711 product produced and sold by the Applicant (chemical analysis: $Al_2O_3$: 45.5 wt %, $ZrO_2$: 41 wt %, $SiO_2$: 12 wt %, $Na_2O$: 1 wt %, remainder: 0.5 wt %). This product is widely used but its wear resistance is now insufficient to meet the changes currently required by glassmakers, which are a faster drawing-off rate and, most importantly, an increased furnace service life.

Products containing chromium oxide currently provide an alternative to AZS electroslag products.

Alumina-chromium-zirconia-silica (ACZS) products are sometimes encountered. One example is the ER-2161 product produced and sold by the Applicant (chemical analysis: $Al_2O_3$: 31.5 wt %, $Cr_2O_3$: 26 wt %, $ZrO_2$: 26 wt %, $SiO_2$: 13 wt %, remainder; 3.5 wt %). Its corrosion resistance is better than that of electroslag AZS products, but is still insufficient, in particular compared to sintered products containing more chromium oxide.

An example of this type of product is the C-1221 product manufactured and sold by CORHART REFRACTORIES Co. and essentially consisting of 94 wt % chromium oxide and 4 wt % titanium oxide.

This type of product is highly resistant to corrosion by the molten glass but has the major drawback of coloring the glass by releasing chromium oxide into the molten glass. This is an unacceptable problem in the fabrication of alkali-lime glass, in which the chromium oxide content must be less than 5 ppm. For example, measurements were carried out in an alkali-lime glass furnace with a chromium oxide throat. The measured chromium oxide content of the glass leaving the furnace was 45 ppm, which is entirely unacceptable for alkali-lime glass.

The glasses most affected by this problem of coloration are alkali-lime glasses for luxury decanters and drinking vessels, but also fluorinated translucent glass, lead (crystal) glass, hard borosilicate glass and tinted borosilicate glass.

Note that it is not sufficient, to make a material suitable for producing glass furnace throats, for it to have excellent resistance to corrosion by the molten glass. It must also have a thermal conductivity suited to the low thermal insulation of the throat. For example, materials with a very high content of zirconia, although having a greater resistance to corrosion by the molten glass than AZS materials, have poor thermal conductivity, which makes them unsuitable for producing throats. Corrosion becomes less serious as the temperature falls. For the throat application, the requirement is therefore for the lowest possible glass/refractory interface temperature. The refractory used must therefore be a good conductor of heat, so that external cooling is efficient.

There is therefore a need for a glass furnace throat having improved resistance to wear by the molten glass.

The invention stems from finding that sintered tin oxide behaves extremely well in glass furnace throats. In particular, this material has an excellent combination of corrosion resistance and thermal conductivity.

The invention therefore concerns the use of blocks based on sintered tin oxide to produce the throat of a glass furnace.

By sintered tin oxide is meant a material consisting of at least 95 wt % and preferably at least 98 wt % of $SnO_2$.

The remaining minor constituents can include one or more of the following: copper oxide (CuO), manganese oxide ($MnO_2$), and antimony oxide ($Sb_2O_3$). Chromium oxide is to be avoided because it causes coloration of the molten glass.

The following description and non-limiting example explain the invention further.

Figure 1:
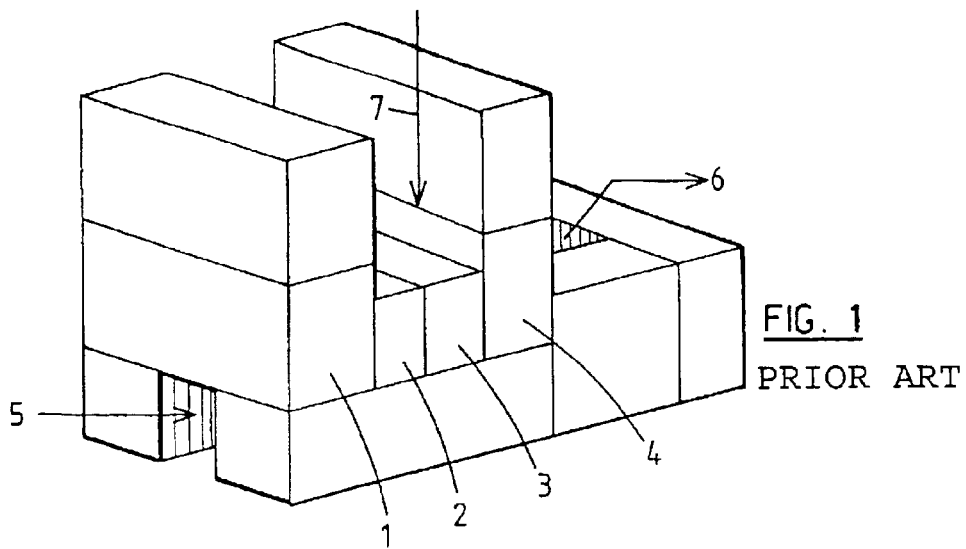
FIG. 1 is a diagrammatic view of a conventional glass furnace throat.

FIG. 1 shows a conventional glass furnace throat consisting of large monolithic blocks 1, 2, 3 and 4, currently made from electroslag AZS material or a material based on chromium oxide. The molten glass coming from the melting bath (not shown) enters the throat at 5 and leaves it at 6. A cooling system blows air onto the blocks 2 and 3, as indicated by the arrow 7.

Figure 2:
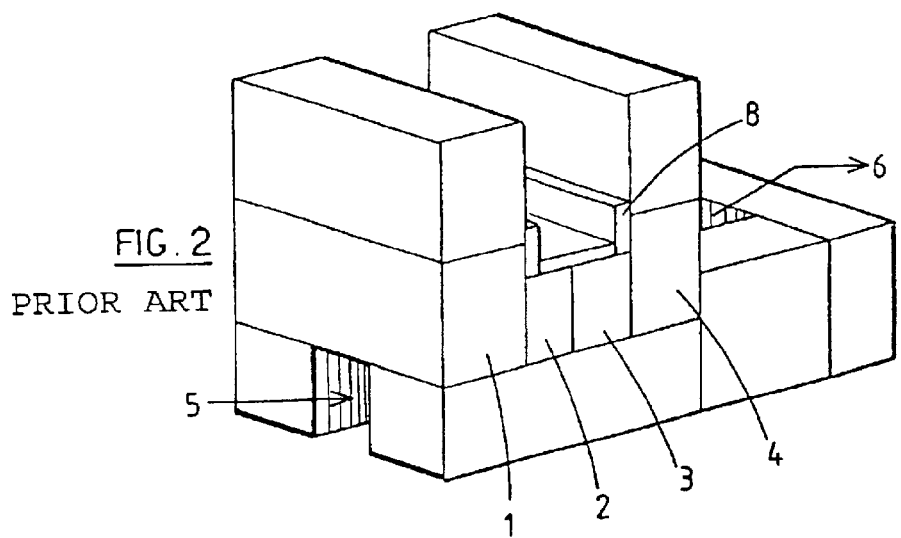
FIG. 2 is a diagrammatic view of another conventional glass furnace throat.

FIG. 2 shows a variant of the FIG. 1 throat in which cooling by blowing air is replaced by the use of a cooling jacket 8 through which water is circulated.

The invention substitutes sintered blocks based on tin oxide for the AZS, ACZS or chromium oxide blocks.

Figure 3:
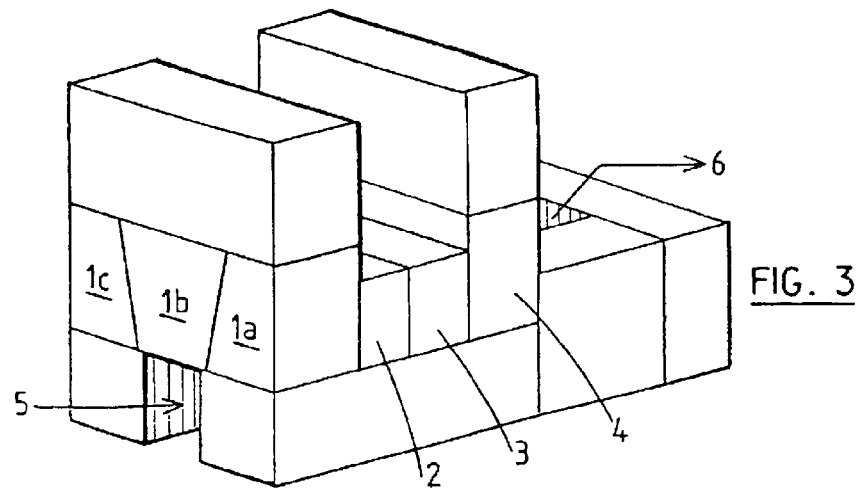
FIG. 3 is a diagrammatic view showing an embodiment of the invention.

In an embodiment of the invention shown in FIG. 3, at least one of the monolithic blocks 1 to 4 is replaced by an assembly of smaller blocks based on sintered tin oxide. As shown here by way of example, the block 1 is replaced by three blocks 1a, 1b and 1c.

The tests described below were used to test the material under the conditions of the application.

Corrosion by the glass was evaluated by a test consisting of rotating samples with a diameter of 22 mm and a length of 100 mm immersed in a bath of molten glass. The glass was an alkali-lime glass heated to 1 450° C. and the test continued for 90 hours. At the end of that period, the corroded volume was evaluated for each sample. The corroded volume of a prior art material (ER-1711) sample was chosen as a reference. A corrosion index Ic is defined as the ratio of that corroded volume to that of any other sample multiplied by 100. Thus values of the corrosion index greater than 100 indicate less wear by corrosion than the chosen reference.

The same test can also be used to evaluate the immersed corrosion index. For this, only the corroded volume of the portion of the sample totally immersed in the molten glass bath is considered. In fact, the so-called "flux line" area, which corresponds to the three-material (refractory/molten glass/air) interface at which wear is most marked, is ignored. The corrosion index obtained in this way corresponds better to the throat application since in this zone all of the material is in contact with the molten glass and the "flux line" effect that is well known in the melting bath is not encountered.

The stone release index corresponds to the susceptibility of the material to break up into fragments (stones) that are entrained by the molten glass and are not "digested" by the glass. This phenomenon is the cause of unacceptable defects in the glass. The stone release index is obtained from the T-test described by A. Auerbach, Vortrag in Fachausschuss 2 der DGG, Frankfurt, October 1972. The tests were carried out with an alkali-lime glass and a lead glass at a temperature of 1 450° C. for 90 hours. The stone release index varied from 0 to 5. The best materials have an index from 0 to 1.

The bubble index corresponds to the susceptibility of the material to form bubbles in contact with the molten glass. Like stone release, this phenomenon leads to unacceptable defects and must be avoided. The bubble index is determined by the method described by A. Auerbach in the Proceedings of the Symposium on the Manufacture of Glass, Madrid, 11–14 Sep. 1973, pages 259–312. The test was carried out with an alkali-lime glass heated to 1 100° C. and lasted 1 hour. The bubble index varied from 0 to 10. Values from 0 to 1 correspond to a very low level of bubbling and are highly satisfactory.

The T-1186 product from CORHART REFRACTORIES Co. was used as an example of a material based on tin oxide. Its average chemical analysis indicated a tin oxide content of 98.5% with 1% $Sb_2O_3$ and approximately 0.3% CuO. The oxides of antimony and copper are the only intentional additives and are well known in products based on tin oxide. The copper oxide may be partly or totally replaced by manganese oxide. The other substances present were impurities introduced by the raw materials. Oxides such as chromium oxide must be especially avoided because of the coloration problem referred to above.

The T-1186 product was compared to the ER-1711 and C-1221 products.

Table 1 below sets out the test results and a few specifications of the materials.

Note that the material based on tin oxide has 1.5 times the corrosion resistance of the electroslag AZS materials. The tin oxide material is still less resistant to corrosion than the chromium material but does not have the unacceptable drawback of coloring the glass.

It is also important to note that the stone release and bubble indices remain as good as those of the materials currently used.

TABLE 1

|  | ER-1711 | C-1221 | T-1186 |
|---|---|---|---|
| Ic | 100 | 186 | 155 |
| Immersed Ic | 100 | 233 | 158 |
| Stone release index (alkali-lime glass) | 0–1 | 0–1 | 0–1 |
| Bubble index | 0–1 | 0–1 | 0–1 |
| Thermal conductivity at 1000° C. | 4 W/m*K | 2.7 W/m*K | 10 W/m*K |
| Expansion at 1000° C. | 0.75% | 0.71% | 0.56% |

On the other hand, as previously mentioned in connection with materials with a very high zirconia content, the throat insulation constraints mean that good corrosion indices do not always guarantee good behavior in the throat application. It is therefore necessary to grade the corrosion index results as a function of the thermal conductivity of the materials.

The thermal conductivity of tin oxide is particularly high. It is 2.5 times that of electroslag AZS and 3.7 times that of the chromium material. This means that external cooling of the material will be much more efficient and that, for the same thickness of refractory, the glass/refractory interface temperature will be lower, which commensurately reduces corrosion by the molten glass. This property is economically advantageous because the great majority of throats use either cooling by a water-jacket placed directly on the throat ceiling or cooling by blowing air.

Thus the combination of the corrosion index and thermal conductivity indicates excellent behavior of the tin oxide blocks in the throat.

The high cost of products based on tin oxide compared to the products currently used and potential problems in the feasibility of making large components can lead to slight modifications to the design of the throat.

Accordingly, to reduce the cost, a sintered tin oxide/electroslag AZS composite assembly may be envisaged. The portion most exposed to corrosion and erosion by the molten glass (block 1 in FIG. 1) would be of tin oxide and the remainder of the throat would be of electroslag AZS. This type of composite assembly can be envisaged provided that the coefficients of expansion of the materials employed are similar.

Also, to avoid a proliferation in the number of joints and therefore in the number of sites where corrosion is more prevalent, composite sintered blocks could be used, each having an AZS zone and one or more tin oxide zones.

Also, to improve the feasibility of industrial manufacture of the components, replacing the large blocks with an assembly of several smaller blocks can be envisaged, as shown diagrammatically in FIG. 3.

It goes without saying that the embodiments described are provided by way of example only and are open to modification without departing from the scope of the invention, in particular by the substitution of technical equivalents.

What is claimed is:

1. A process of producing a throat of a glass furnace, comprising assembling a plurality of refractory blocks in the shape of the throat of a glass furnace, and including among said plurality of refractory blocks as at least one but less than all of said blocks, a block or blocks of sintered tin oxide.

2. The method as claimed in claim 1, wherein some of said blocks are of electroslag chromium oxide.

3. The method as claimed in claim 1, wherein some of said blocks are of alumina-zirconia-silica.

4. A throat of a glass furnace, comprising a plurality of refractory blocks in the shape of the throat of a glass furnace, and among said plurality of refractory blocks as at least one but less than all of said blocks, a block or blocks of sintered tin oxide.

5. The throat of a glass furnace as claimed in claim 4, wherein some of said blocks are of electroslag chromium oxide.

6. The throat of a glass furnace as claimed in claim 4, wherein some of said blocks are of alumina-zirconia-silica.

* * * * *

UNITED STATES PATENT AND TRADEMARK OFFICE
CERTIFICATE OF CORRECTION

PATENT NO. : 6,880,365 B1
APPLICATION NO. : 10/110752
DATED : April 19, 2005
INVENTOR(S) : Jacques Marius Louis Guigonis It is certified that error appears in the above-identified patent and that said Letters Patent is hereby corrected as shown below:

Col. 6, line 6, Add the following claims:

--7. A process of producing a throat of a glass furnace, comprising assembling a plurality of refractory blocks in the shape of the throat of a glass furnace, and including among said plurality of refractory blocks at least one block of sintered tin oxide.
8. The method as claimed in claim 7, wherein some of said blocks are of electroslag chromium oxide.
9. The method as claimed in claim 7, wherein some of said blocks are of alumina-zirconia-silica.
10. A throat of a glass furnace, comprising a plurality of refractory blocks in the shape of the throat of a glass furnace, and among said plurality of refractory blocks at least one block of sintered tin oxide.
11. The throat of a glass furnace as claimed in claim 10, wherein some of said blocks are of electroslag chromium oxide.
12. The throat of a glass furnace as claimed in claim 10, wherein some of said blocks are of alumina-zirconia-silica.
13. A process of producing a throat of a glass furnace, comprising assembling a plurality of refractory blocks in the shape of the throat of a glass furnace, and including among said plurality of refractory blocks at least one composite block comprising a zone of alumina-zirconia-silica, and at least one zone of sintered tin oxide.
14. The method as claimed in claim 13, wherein some of said blocks are of electroslag chromium oxide.
15. The method as claimed in claim 13, wherein some of said blocks are of alumina-zirconia-silica.
16. A throat of a glass furnace, comprising a plurality of refractory blocks in the shape of the throat of a glass furnace, and among said plurality of refractory blocks at least one composite block comprising a zone of alumina-zirconia-silica, and at least one zone of sintered tin oxide.
17. The throat of a glass furnace as claimed in claim 16, wherein some of said blocks are of electroslag chromium oxide.

UNITED STATES PATENT AND TRADEMARK OFFICE
CERTIFICATE OF CORRECTION

PATENT NO. : 6,880,365 B1
APPLICATION NO. : 10/110752
DATED : April 19, 2005
INVENTOR(S) : Jacques Marius Louis Guigonis It is certified that error appears in the above-identified patent and that said Letters Patent is hereby corrected as shown below:

Col. 6, line 6, Add the following claims: (cont'd)

18. The throat of a glass furnace as claimed in claim 16, wherein some of said blocks are of alumina-zirconia-silica.--

Signed and Sealed this

Twenty-second Day of May, 2007

JON W. DUDAS
*Director of the United States Patent and Trademark Office*